US007581125B2

United States Patent
Ranganathan et al.

(10) Patent No.: US 7,581,125 B2
(45) Date of Patent: Aug. 25, 2009

(54) AGENT FOR MANAGING POWER AMONG ELECTRONIC SYSTEMS

(75) Inventors: Parthasarathy Ranganathan, Fremont, CA (US); Khaldoun Alzien, Houston, TX (US); Thomas Flynn, Magnolia, TX (US); Phillip Leech, Houston, TX (US); Charles Shaver, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 444 days.

(21) Appl. No.: 11/232,525

(22) Filed: Sep. 22, 2005

(65) Prior Publication Data

US 2007/0067656 A1    Mar. 22, 2007

(51) Int. Cl.
*G06F 1/00* (2006.01)
*G06F 1/26* (2006.01)
*G06F 1/32* (2006.01)

(52) U.S. Cl. .................. 713/320; 713/300; 713/340
(58) Field of Classification Search .......... 713/300, 713/320, 340
See application file for complete search history.

(56) References Cited

U.S. PATENT DOCUMENTS

| 5,339,445 | A  | * | 8/1994  | Gasztonyi ............. 713/324 |
| 6,574,740 | B1 | * | 6/2003  | Odaohhara et al. ..... 713/323 |
| 6,859,882 | B2 |   | 2/2005  | Fung |
| 6,934,864 | B2 |   | 8/2005  | Chu et al. |
| 7,240,223 | B2 | * | 7/2007  | de Cesare et al. ....... 713/300 |
| 2003/0056126 | A1 | * | 3/2003 | O'Connor et al. ....... 713/300 |
| 2004/0163001 | A1 | * | 8/2004 | Bodas ................. 713/300 |
| 2004/0268166 | A1 | * | 12/2004 | Farkas et al. ........... 713/320 |
| 2005/0102544 | A1 |   | 5/2005  | Brewer et al. |
| 2005/0138438 | A1 |   | 6/2005  | Bodas |
| 2005/0177755 | A1 |   | 8/2005  | Fung |
| 2005/0182986 | A1 | * | 8/2005 | Anderson et al. ........ 713/340 |
| 2006/0143612 | A1 |   | 6/2006  | Cromer et al. |

OTHER PUBLICATIONS

Bohrer, P. et al., "The Case for Power Management in Web Servers", IBM Research, Austin TX, http://www.research.ibm/com/arl, downloaded Jan. 9, 2006.
Chase, J.S. et al., "Managing Energy and Server Resources in Hosting Centers", downloaded Oct. 18, 2005.
Helmbold, D.P. et al., "A Dynamic Disk Spin-Down Technique for Mobile Computing", downloade Oct. 18, 2005.
Lebeck, A.R. et al., "Power Aware Page Allocation", (ASPLOS-IX), Nov. 2000.

(Continued)

*Primary Examiner*—Thomas Lee
*Assistant Examiner*—Ji H Bae (57) ABSTRACT

A power management agent for managing power among electronic systems includes a module for predicting a future power consumption level of the electronic systems, a module for determining a power budget threshold for the electronic systems, and a module for determining whether a predicted future power consumption level will exceed the power budget threshold. The power management agent also includes a module for selecting one or more of the electronic systems to throttle in response to a determination that the predicted future power consumption level will exceed the power budget threshold and a module for selecting a throttle level to be applied to the selected one or more of the electronic systems to substantially prevent the future power consumption level from exceeding the power budget threshold.

21 Claims, 4 Drawing Sheets

OTHER PUBLICATIONS

Pinheiro, E. et al., "Load Balancing and Unbalancing for Power and Performance in Cluster-Based Systems", downloaded Oct. 18, 2005.

Advanced Configuration & Power Interface, http://www.acpi.info/, downloaded Oct. 18, 2005.

Felter, W. et al., "A Performance-Conserving Approach for Reducing Peak Power Consumption in Server Systems", Jun. 2005, ICS '05, Boston, MA.

Bohrer, P. et al, "The Case for Power Management in Web Servers", IBM Research, Austin TX, http://www.research.ibm.com/arl, downloaded Jan. 9, 2006.*

Chase, J. S. et al. "Managing Energy and Server Resources in Hosting Centers", downloaded Oct. 18, 2005.*

Helmbold, D. P. et al, "A Dynamic Disk Spin-Down Technique for Mobile Computing", downloaded Oct. 18, 2005.*

Lebeck, A. R. et al, "Power Aware Page Allocation", ASPLOS-IX - Nov. 2000.*

Pinehiero, E et al, "Load Balancing and Unbalancing for Power and Performance in Cluster-Based Systems", downloaded Oct. 18, 2005.*

Advanced Configuration & Power Interface, http://www.acpi.info/, downloaded Oct. 18, 2005.*

* cited by examiner

AGENT FOR MANAGING POWER AMONG ELECTRONIC SYSTEMS

CROSS-REFERENCES

This application is related to U.S. patent application Ser. No. 11/232,526, entitled "Power Consumption Management Among Compute Nodes", filed by Parthasarathy Ranganathan et al. on Sep. 22, 2005, the disclosure of which is hereby incorporated by reference in its entirety.

BACKGROUND

Blade servers (or blade PCs) represent a fast growing segment in the computing industry because of the compaction, consolidation, modularity, management, and maintenance afforded by the blade servers. The growth in the use of blade servers has, however, led to ever increasing challenges in efficiently powering and cooling the blade servers. The challenges include attempts at minimizing the relatively high operational capital and recurring costs associated with enterprise environments having a relatively large number of blade servers. The challenges also include attempts at extending the useful lives of the blade servers by maintaining their temperatures within prescribed limits.

Heretofore, computer systems generally and blade servers in particular, have not been power managed to maintain performance and reduce power consumption. Instead, these components are typically over-provisioned so as to be able to meet peak demands. Therefore, these components typically consume relatively large amounts of power while doing little or no useful work. Operation of these components at the over-provisioned levels has required that cooling resources also be increased to meet the higher demands, thereby increasing the inefficiencies associated with current computer system operations.

A technique for operating computer systems generally, and blade systems in particular, such that the costs associated with powering and cooling the computer systems are substantially minimized would therefore be beneficial.

SUMMARY OF THE INVENTION

A power management agent for managing power among electronic systems is disclosed herein. The power management agent includes a module for predicting a future power consumption level of the electronic systems, a module for determining a power budget threshold for the electronic systems, and a module for determining whether a predicted future power consumption level will exceed the power budget threshold. The power management agent also includes a module for selecting one or more of the electronic systems to throttle in response to a determination that the predicted future power consumption level will exceed the power budget threshold and a module for selecting a throttle level to be applied to the selected one or more of the electronic systems to substantially prevent the future power consumption level from exceeding the power budget threshold.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

As described in greater detail herein below, a power management agent is configured to enforce a power budget among a plurality of electronic systems. The power management agent is configured to enforce the power budget through a prediction of power budget threshold violations and policy-driven recommendations for power throttling of the electronic systems, to substantially prevent the power consumption levels of the electronic systems from substantially exceeding the power budget threshold. The power management agent also provides adaptive enforcement of the power budget because it is based upon software. In addition, through enforcement of the power budget, the costs associated with the power consumed by the electronic systems may be substantially reduced.

Figures 1A, 1B:
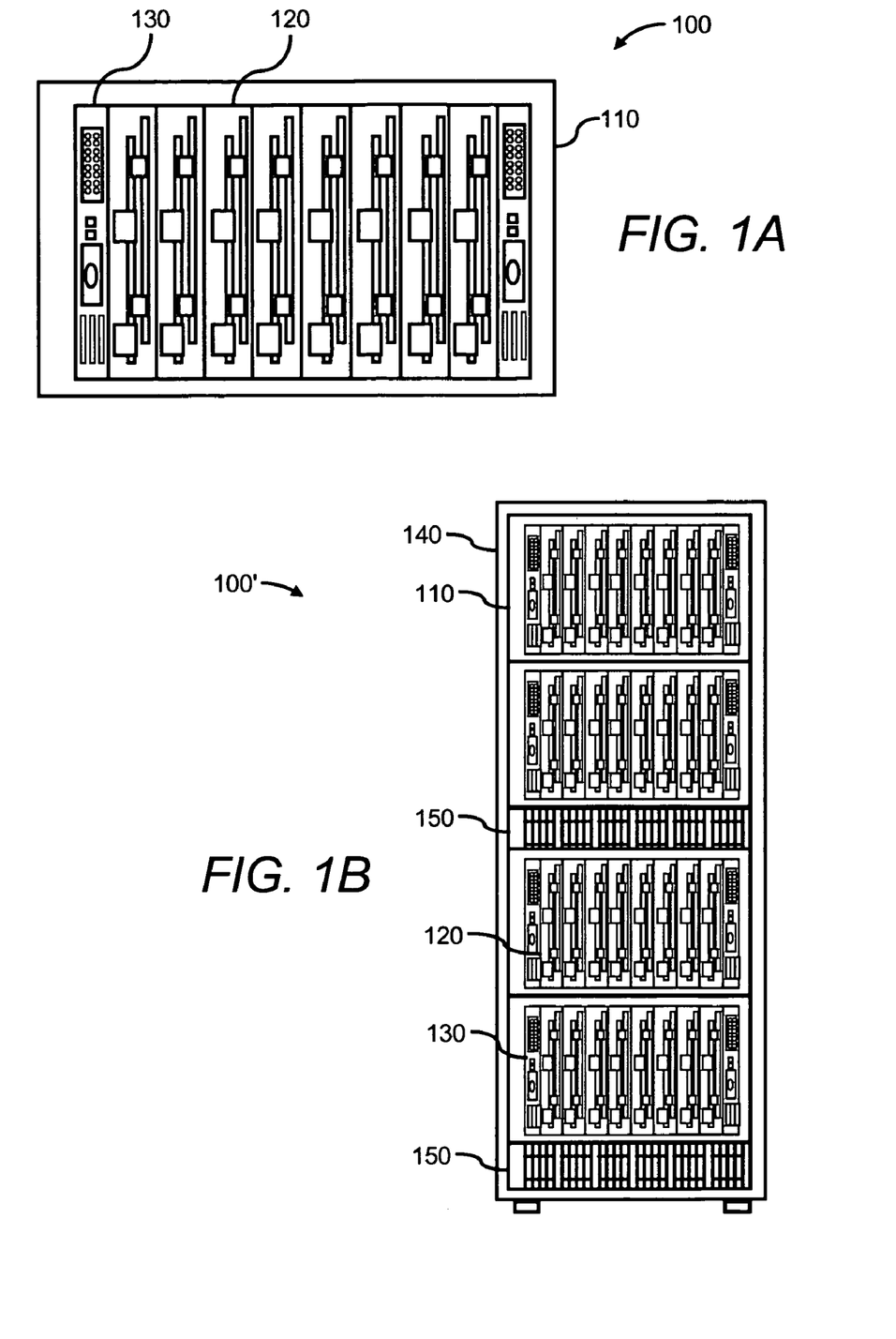
FIG. 1A shows a simplified frontal view of an electronic environment in which various embodiments of the invention may be practiced, according to an embodiment of the invention.
FIG. 1B shows illustrates a simplified frontal view of another electronic environment in which various embodiments of the invention may be practiced, according to an embodiment of the invention.

With reference first to FIG. 1A, there is shown a simplified frontal view of an electronic environment 100 in which various embodiments of the invention may be practiced. The electronic environment 100 depicted in FIG. 1A generally comprises an enclosure 110 housing a number of electronic systems 120, such as, computer systems, servers, memories, hard drives, etc. In FIG. 1A, however, the electronic systems 120 are depicted as comprising blade PCs arranged in horizontal alignment with respect to each other in the enclosure 110. The electronic systems 120 are also depicted as including various components generally known to form part of conventional electronic systems, such as, various connectors, buttons, indicators, etc.

In addition to the electronic systems 120, the enclosure 110 may include other components, such as, interconnects 130. The interconnects 130 generally operate to route network signals from the electronic systems 120. Two interconnects 130 may be provided to provide redundancy for the electronic systems 120.

Although eight electronic systems 120 and two interconnects 130 have been illustrated as being contained in the enclosure 110, any reasonably suitable number of electronic systems 120 and interconnects 130 may be included in the enclosure without departing from a scope of the invention. In addition, the electronic environment 100 may include additional components and some of the components depicted may be removed and/or modified without departing from a scope of the electronic environment 100.

It should also be understood that various embodiments of the invention may be practiced in electronic environments having different configurations than the electronic environment 100 depicted in FIG. 1A. By way of example, various embodiments of the invention may be practiced in electronic environments having different types of electronic systems 120, for instance, in electronic environments having horizontally arranged servers. In addition, or alternatively, various embodiments of the invention may be practiced in a larger scale computing environment in comparison with the electronic environment 100 depicted in FIG. 1A.

An example of a larger scale electronic environment 100' is depicted in FIG. 1B. More particularly, FIG. 1B illustrates a simplified frontal view of a rack 140, such as, an electronics cabinet, housing four enclosures 110. The rack 140 is also depicted as including two sets of power supplies 150. The rack 140 may, however, house any reasonably suitable number of enclosures 110, such as, six, eight, or more, as well as any reasonably suitable number of power supplies 150. In addition, the enclosures 110 included in the rack 140 may also house any reasonably suitable number of computer systems 120.

Various embodiments of the invention may further be practiced in electronic environments containing a relatively larger number of electronic systems 120 than are depicted in FIG. 1B. For instance, various embodiments of the invention may be practiced amongst electronic systems contained in a data center or electronic systems positioned at different geographic locations with respect to each other. The different geographic locations may include, for instance, different rooms, different buildings, different counties, different countries, etc.

Figure 2:
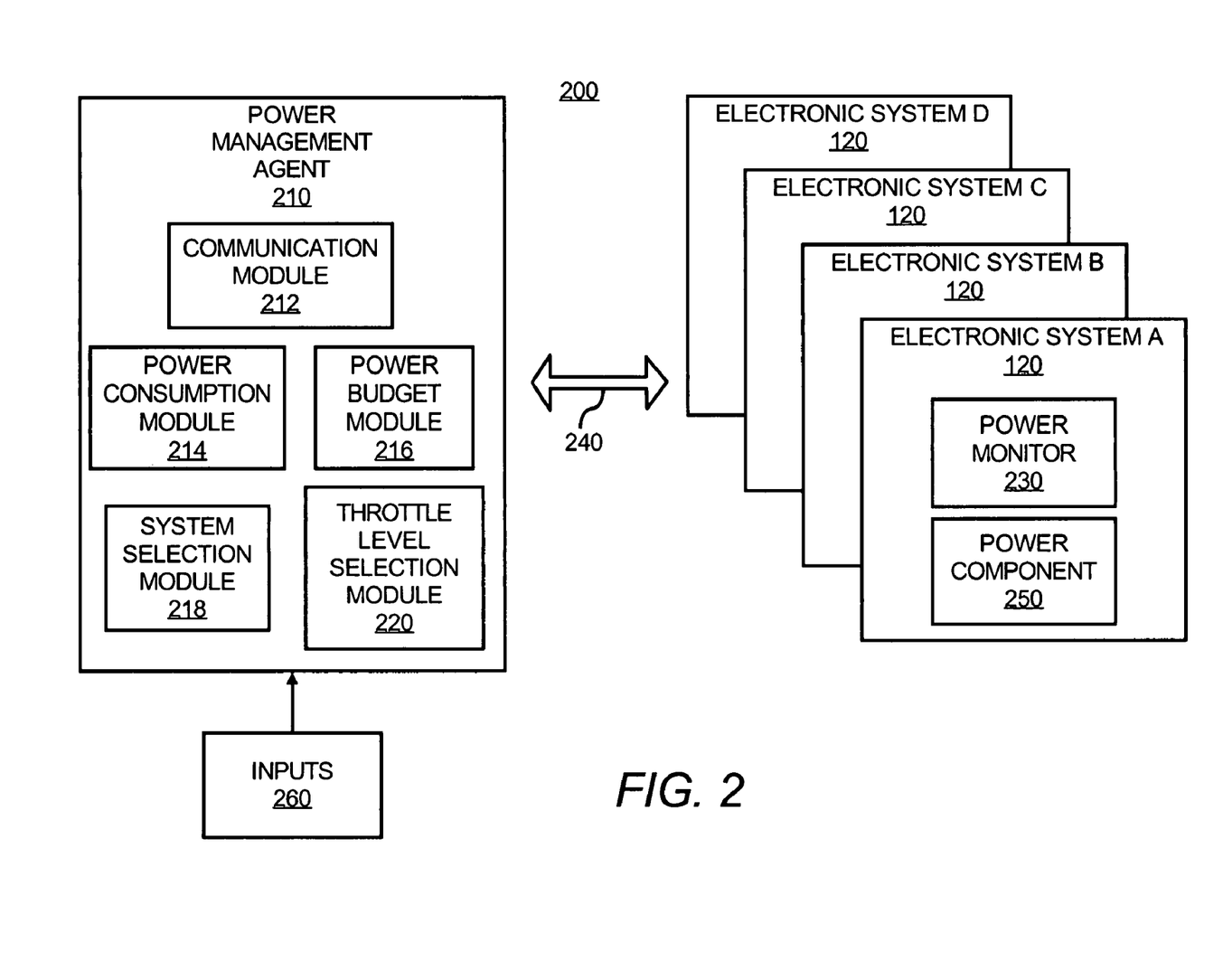
FIG. 2 illustrates a block diagram of a power management system according to an embodiment of the invention.

With reference now to FIG. 2, there is shown a block diagram of a power management system 200 according to an example of the invention. It should be understood that the following description of the power management system 200 is but one manner of a variety of different manners in which such a power management system 200 may be operated. In addition, it should be understood that the power management system 200 may include additional components and that some of the components described may be removed and/or modified without departing from a scope of the power management system 200.

The following description of the power management system 200 makes specific reference to the elements depicted in the electronic environments 100, 100'. It should, however, be understood that the power management system 200 may be implemented in environments that differ from those environments 100, 100' depicted in FIGS. 1A and 1B, as described above.

As shown in FIG. 2, the power management system 200 includes a power management agent 210. The power management agent 210 is depicted as including a communication module 212, a power consumption module 214, a power budget module 216, a system selection module 218, and a throttle level selection module 220, which the power management agent 210 may implement in performing various functions as described below. Some or all of the modules 212-220 may comprise software stored either locally or in an external memory which the power management agent 210 may implement. In addition, or alternatively, some or all of the modules 212-220 may comprise one or more hardware devices that may be implemented by the power management agent 210. As such, for example, the power management agent 210 may be stored at a single location or the power management agent 210 may be stored in a distributed manner across multiple locations, where the locations comprise at least one of hardware and software.

Generally speaking, the power management agent 210 is configured to enforce various conditions among the electronic systems 120, one of which is a power budget, as described in greater detail herein below. The power management agent 210 may comprise, for instance, a centralized module in an enclosure manager (not shown) of an enclosure 110 or as a distributed control agent on one or more of the individual electronic systems 120. In addition, or alternatively, the power management agent 210 may comprise a control agent stored in one or more electronic systems outside of an enclosure 110.

In any regard, the communication module 212 is configured to enable communications between the power management agent 210 and a plurality of electronic systems 120. The communication module 212 may comprise software and/or hardware configured to act as an interface between the power management agent 210 and at least one other power management agent. The at least one other power management agent may be located, for instance, in relatively close proximity to the power management agent 210, in a different geographic location as compared to the power management agent 210, etc. Communications between the power management agent 210 and the at least one other power management agent may include communications of power thresholds, policy recommendations, etc. In this regard, for instance, operations of the power management agent 210 described in greater detail herein below may be performed by one or more power management agents 210.

The communication module 212 may also comprise software and/or hardware configured to act as an interface between the power management agent 210 and the plurality of electronic systems 120 to thereby enable the communications. In one example, the power management agent 210 is configured to receive information pertaining to the amount of power being consumed by each of the electronic systems 120. The amount of power being consumed by each of the electronic systems 120 may be detected through use of power monitors 230 associated with each of the electronic systems 120. The power monitors 230 may comprise, for instance, relatively simple current sense resistors connected to an analog-to-digital converter. In addition, or alternatively, the power monitors 230 may comprise software configured to calculate the amounts of power consumed by the electronic systems 120.

Information pertaining to the amount of power being consumed by the electronic systems 120 may be transmitted to the power management agent 210 as indicated by the arrow 240. In this regard, the arrow 240 may represent, for instance, a network, a bus, or other communication means configured to enable communications between the power management agent 210 and the electronic systems 120. In addition, the arrow 240 may represent communication means between the power management agent 210 and electronic systems 120 housed in one or more enclosures 110, one or more racks 140, one or more data centers, etc. As such, for instance, the power management agent 210 may enforce a power budget across multiple electronic systems 120, regardless of their geographic locations with respect to each other and the power management agent 210.

The power management agent 210 may implement the power consumption module 214 to monitor the current power consumption levels of the electronic systems 120. In instances where it is possible to predict future behaviors of the electronic systems 120 based upon past behaviors, the power management agent 210 may implement the power consumption module 214 to store the power consumption information to create and maintain a log of how the electronic systems 120 have previously behaved under various conditions. This log may be implemented to substantially predict how the electronic systems 120 may behave under various conditions.

However, in instances where past behavior is insufficient to adequately predict future behaviors of the electronic systems 120, another prediction algorithm may be employed to predict future behaviors of the electronic systems 120. The selection of another prediction algorithm may be a function of the error limits allowable with mispredictions. For instance, where the error limits are more relaxed, models based upon function extrapolation, Markov models, etc., may be used as another prediction algorithm. As another example, where the error limits are more strict, relatively more conservative models may be employed as another prediction algorithm to therefore include potential worst-case scenarios.

Based upon the predicted power consumption levels, the power management agent 210 may transmit recommendations to throttle the electronic systems 120 to thereby vary their power consumption levels. In response to receipt of these instructions, the electronic systems 120 may vary the amounts of power consumed by them in a variety of different manners. For instance, power consumption levels of the electronic systems 120 may be varied through manipulation of one or more power components 250, for instance, processors, memories, etc., in the electronic systems 120. The power components 250 may be configured to use different power states in ACPI specifications of the electronic systems 120. As another example, the voltage and frequency of the power components 250 of the electronic systems 120 may be throttled or scaled to vary the power consumption levels of the electronic systems 120. As a further example, the power states or the disk spin rates of memories contained in the electronic systems 120 may be varied. As a yet further example, one or more of the components contained in the electronic systems 120 may be activated or deactivated or heterogeneity in these components may be used to vary the power consumption levels of the electronic systems 120. In addition, the power management agent 210 may control the throttling of the electronic systems 120 such that their power consumption levels are varied in at least one of an incremental and a non-incremental manner.

In one example, the power management agent 210 may determine whether the power consumption levels are predicted to exceed a predetermined power budget threshold. As shown in FIG. 2, the power management agent 210 may receive inputs 250 from one or more sources. For instance, the power management agent 210 may receive the terms of a service level agreement ("SLA") and power budget levels from an administrator or from a program configured to supply the power management agent 210 with the SLA terms and power budget levels. In one regard, the power management agent 210 may operate the electronic systems 120 to comply with the terms of the SLA. In addition, and as described below, the power budget levels may be determined at various times and the level of rigidity in the enforcement of the selected power budget levels by the power management agent 210 may also be varied.

The power management agent 210 may implement the power budget module 216 to determine the power budget and the power budget threshold enforced by the power management agent 210 at design time or at run-time. The power budget may be determined at design time based upon various constraints of the electronic environment 100, 100' if, for instance, the targeted benefits of the power budget enforcement are geared towards reducing the provisioning of cooling and power delivery or increasing flexibility in the choice of components selected for the electronic environment 100, 100'. For example, reverse calculations from a specific cooling or power delivery budget may be implemented to determine the selected power budget value and associated power budget threshold.

In other instances, the power budget threshold may comprise a run-time parameter that is varied based on an external trigger, such as, a power supply failure, reduced resource utilizations, etc. In addition, the specific value and the level of rigidity in the enforcement of the power budget may depend upon the objective function being optimized and the level of aggressiveness in the design of components included in the electronic environment 100, 100'. For example, the system power budget may be set to a power budget value close to the estimated $90^{th}$ percentile of typical usage of the expected workloads, determined, for instance, through profiling, with an "allowance factor" for unexpected transients. In this example, more conservative power budget value settings may use an estimate of the peak values while more aggressive approaches may use the estimated average power consumption values. Similarly, optimizations targeting cooling and average power may be more relaxed about brief transients when the power budget is not enforced versus optimizations targeting power delivery.

Based substantially upon the selected power budget and the information received from electronic systems 120, the power management agent 210 may implement the power budget module 216 to determine whether the power consumption levels of the electronic systems 120 are predicted to exceed the predetermined power budget threshold. In the event that the power management agent 210 determines that the power consumption levels of the electronic systems 120 are predicted to exceed the predetermined power budget threshold, the power management agent 210 may implement the system selection module 218 to determine which electronic systems 120 to throttle. In addition, the power management agent 210 may implement the throttle level selection module 220 to determine to what level the selected electronic systems 120 are to be throttled.

The system selection module 218 may employ any of a relatively wide range of heuristics in determining which of the electronic systems 120 to throttle. The heuristics may be based upon policies that range from relatively simple policies to relatively more elaborate policies. An example of a suitable, relatively simple policy includes selecting the electronic systems 120 based upon a "round-robin" allocation scheme. An example of a suitable, relatively more elaborate policy includes selecting the electronic systems 120 based upon the relative priority of tasks running on the individual electronic systems 120 and implementing relatively sophisticated models to predict resource usage among the electronic systems 120. The determination of which policy to implement in determining which of the electronic systems 120 are to be throttled may depend upon, for instance, the processing power of the power management agent 210, the amount of time allocated to making this determination, etc.

In addition, the levels to which the selected electronic systems 120 are to be throttled may be determined by the throttle level selection module 220 according to, for instance, the rigidity associated with enforcement of the power budget. By way of example, the selected electronic systems 120 may be throttled according to relatively conservative levels to account for worst-case variation scenarios when there is little or no slack in the enforcement of the power budget. Alternatively, the selected electronic systems 120 may be throttled more aggressively when the enforcement of the power budget comprises an allowable error range.

The power management agent 210 may transmit instructions or recommendations to the selected electronic systems 120 over the network indicated by the arrow 240. In response, the selected electronic systems 120 may be throttled as recommended by the power management agent 210 to thereby substantially maintain energy consumption levels of the electronic systems 120 within predetermined power budget thresholds.

It should be understood that the depiction of four electronic systems 120 in FIG. 2 is for simplicity of illustration purposes and is not intended to limit the power management system 200 in any respect. In addition, the depiction of a single power management agent 210 is also for simplicity of illustration purposes and the power management system 200 may include any reasonably suitable number of power management agents 210.

Figure 3:
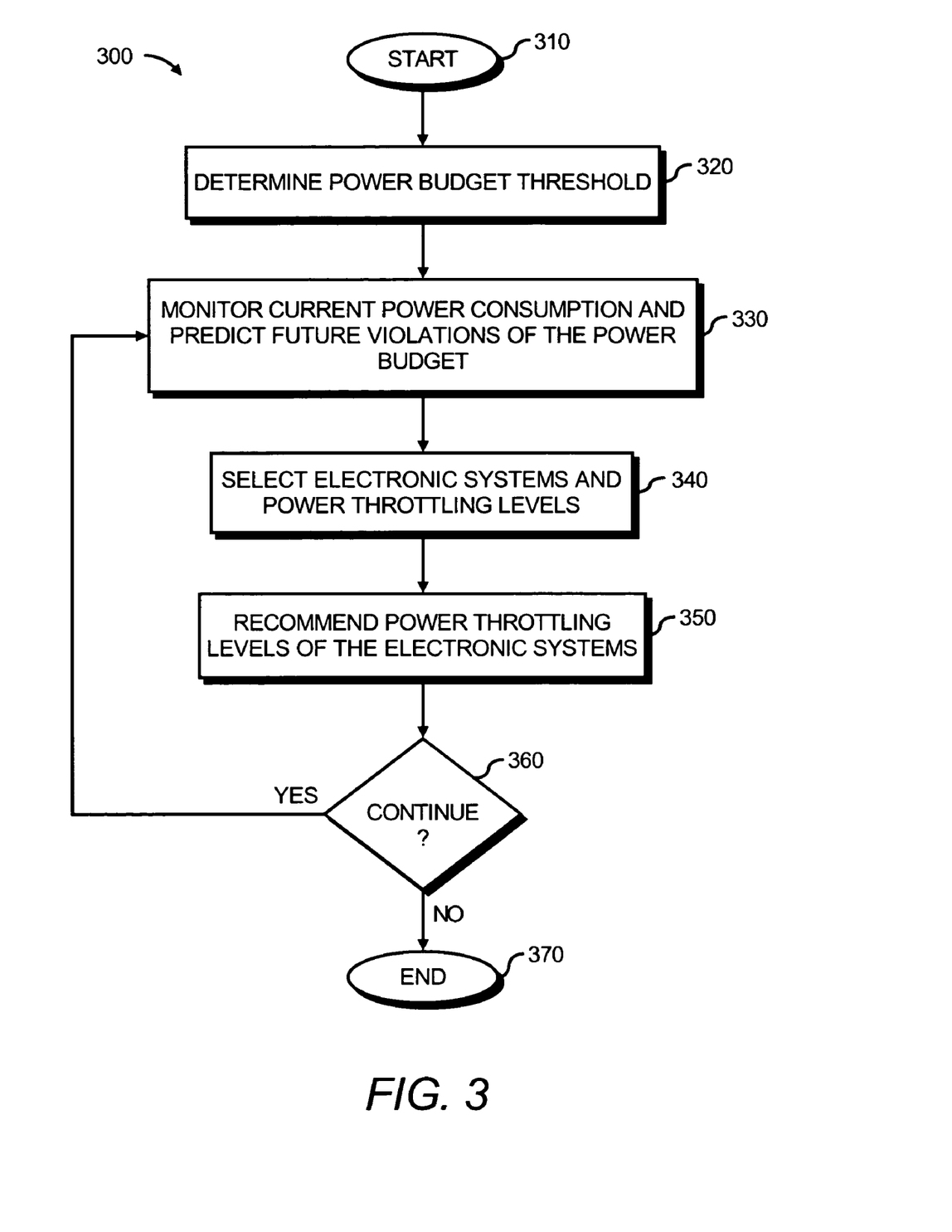
FIG. 3 illustrates a flow diagram of a method for managing power among a plurality of electronic systems, according to an embodiment of the invention.

Turning now to FIG. 3, there is shown a flow diagram of a method 300 for managing power among a plurality of electronic systems, according to an example. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

The description of the method 300 is made with reference to the power management system 200 illustrated in FIG. 2, and thus makes reference to the elements cited therein. It should, however, be understood that the method 300 is not limited to the elements set forth in the power management system 200. Instead, it should be understood that the method 300 may be practiced by a system having a different configuration than that set forth in the power management system 200.

The method 300 may be initiated at step 310 in response to any of a number of stimuli or conditions. For instance, the method 300 may be initiated with activation of the components in the electronic systems 120. In addition, or alternatively, the method 300 may be manually initiated or the power management agent 210 may be programmed to initiate the method 300 at various times, for a set duration of time, substantially continuously, etc.

At step 320, the power budget threshold may be determined. As described above, the power budget threshold may be determined based upon various factors. These factors may include, for instance, the time at which a power budget is determined, predicted resource utilization levels, etc. In addition, the aggressiveness desired in maintaining the power budget may also be determined at step 320.

At step 330, the power management agent 210 may monitor current power consumption levels of the electronic systems 120. The power management agent 210 may also predict future power consumption levels of the electronic systems 120 to thereby predict whether the electronic systems 120 may violate the power budget threshold. Various manners in which the power management agent 210 may monitor current power consumption levels as well as predict future violations of the power budget are described in detail herein above with respect to the power management system 200 depicted in FIG. 2.

Based substantially upon the current and predicted power consumption levels, the power management agent 210 may determine which of the electronic systems 120 are to be throttled and to what levels to generally ensure that the power consumption levels of the power management agent 210 substantially remain within prescribed limits of the power budget, as indicated at step 340. As described in greater detail herein above, the heuristics involved in selecting the electronic systems 120 to be throttled may be based upon any of a relatively wide ranging number of policies. In addition, the levels to which the selected electronic systems 120 are to be throttled may be varied according to, for instance, the rigidity associated with enforcement of the power budget.

At step 350, the power management agent 210 may transmit instructions or recommendations to the selected electronic systems 120. More particularly, for instance, the power management agent 210 may transmit recommendations to the selected electronic systems 120 to throttle their respective power components 250 in manners consistent with those throttling levels determined at step 340. In response to receipt of these recommendations, the electronic systems 120 may throttle their power components 250.

At step 360, the power management agent 210 may determine whether the method 300 is to continue. If a "no" condition is reached at step 360, the method 300 may end as indicated at step 370. The power management agent 210 may determine that the method 300 is to end, for instance, following a predetermined length of time, following a predetermined number of iterations, manually discontinued, etc. If a "yes" condition is reached at step 360, the method 300 may continue beginning at step 330. In addition, steps 330-360 may be repeated substantially continuously. The method 300 may also continue beginning at step 320 in situations where the power budget may be varied, such as, when the power budget is a run-time configurable system parameter. In this case, steps 320-360 may be repeated substantially continuously following step 310, until a "no" condition is reached at step 360.

The operations set forth in the method 300 may be contained as a utility, program, or subprogram, in any desired computer accessible medium. In addition, the method 300 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
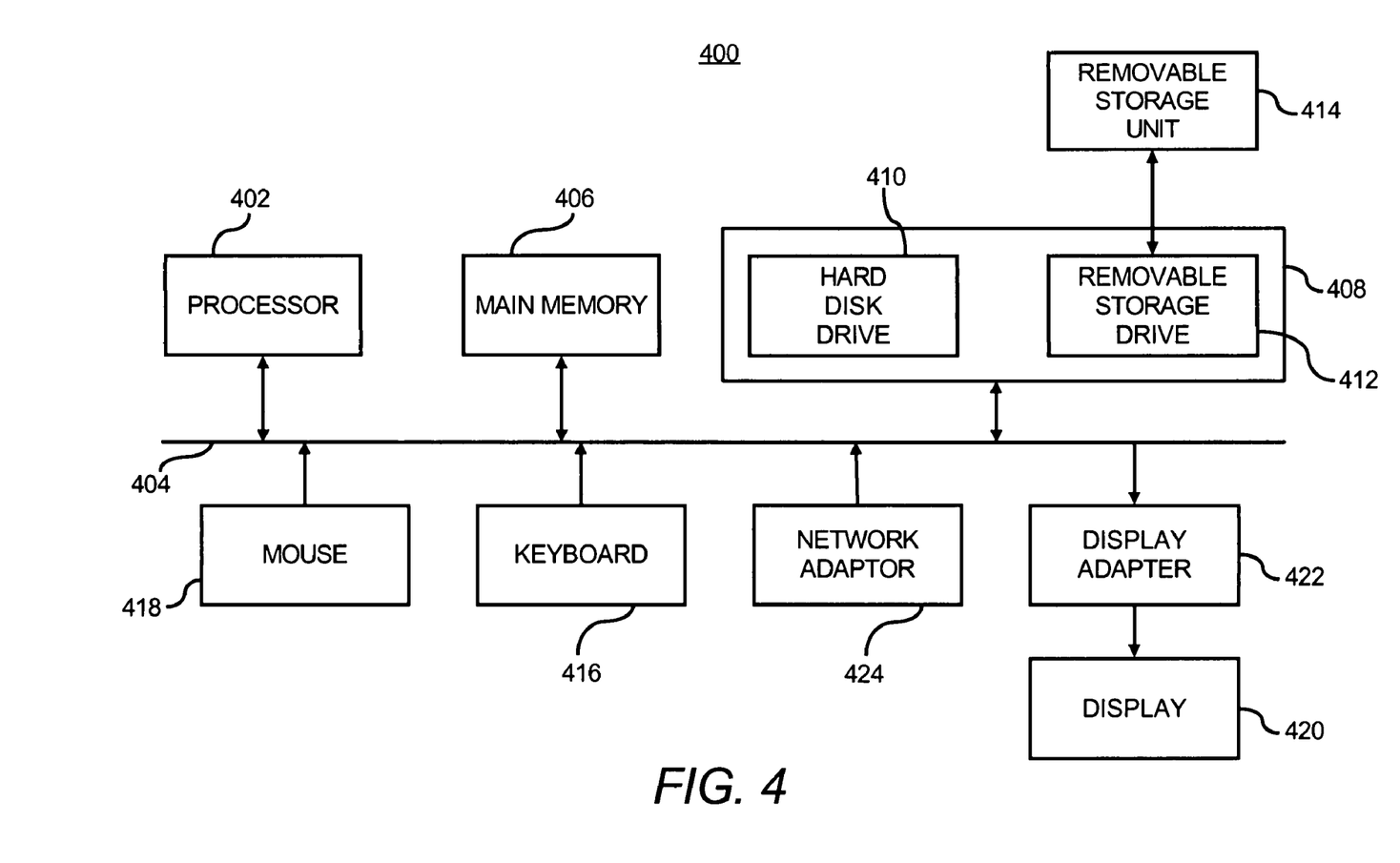
FIG. 4 illustrates a computer system, which may be employed to perform various functions described herein, according to an embodiment of the invention.

FIG. 4 illustrates a computer system 400, which may be employed to perform the various functions of the power management system 210 described herein above, according to an example. In this respect, the computer system 400 may be used as a platform for executing one or more of the functions described hereinabove with respect to the power management agent 210.

The computer system 400 includes one or more controllers, such as a processor 402. The processor 402 may be used to execute some or all of the steps described in the method 300. Commands and data from the processor 402 are communicated over a communication bus 404. The computer system 400 also includes a main memory 406, such as a random access memory (RAM), where the program code for, for instance, the power management agent 210, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the management of power may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, for instance, the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A power management system comprising a power management agent and one or more electronic systems, wherein said power management agent comprises:
   a module for predicting a future power consumption level of the one or more electronic systems;
   a module for determining a power budget threshold for the one or more electronic systems;
   a module for enabling communications between the power management agent and the one or more electronic systems and enabling communications between the power management agent and at least one other power management agent configured to enforce a power budget, to thereby enable management of power among the one or more electronic systems through the power management agent and the at least one other power management agent;
   a module for determining whether a predicted future power consumption level will exceed the power budget threshold;
   a module for selecting at least one of the one or more electronic systems to throttle in response to a determination that the predicted future power consumption level will exceed the power budget threshold and further in response to the relative priority of tasks running on the one or more electronic systems and a prediction of resource usage among the one or more electronic systems; and
   a module for selecting a throttle level to be applied to the selected at least one of the one or more electronic systems to substantially prevent the future power consumption level from exceeding the power budget threshold.

2. The power management agent according to claim 1, further comprising a module for monitoring power consumption levels of the one or more electronic systems.

3. The power management agent according to claim 1, wherein the one or more electronic systems comprise servers.

4. The power management agent according to claim 3, wherein the servers are housed in at least one enclosure.

5. The power management agent according to claim 3, wherein at least two of the servers are positioned in different geographic locations with respect to each other.

6. The power management agent according to claim 1, wherein the one or more electronic systems comprise blade PCs.

7. The power management agent according to claim 1, wherein the module for determining a power budget threshold for the one or more electronic systems is configured to determine the power budget threshold at one or both of design time and run-time.

8. The power management agent according to claim 1, wherein the module for selecting at least one of the one or more electronic systems to throttle is configured to select at least one of the one or more electronic systems according to a round-robin selection scheme.

9. The power management agent according to claim 1, wherein the module for selecting a throttle level is configured to select a throttling level according to a rigidity associated with enforcement of the power budget.

10. A system comprising a plurality of servers and for operating the plurality of servers at a power consumption level below a power budget threshold, the system further comprising:
    a power management agent configured to communicate with the plurality of servers, said power management agent being further configured to determine a power budget threshold, to monitor current power consumption levels of the plurality of servers, to predict future violations of the power budget threshold by the plurality of servers, and to make policy-driven recommendations for power throttling of the plurality of servers to thereby maintain power consumption levels of the plurality of servers substantially within the power budget threshold, wherein the power management agent is further configured to select one or more of the plurality of servers for power throttling according to the relative priority of tasks running on the plurality of servers and a prediction of resource usage among the plurality of servers; and
    the power management agent comprising a module for enabling communications between the power management agent and the plurality of servers and enabling communications between the power management agent and at least one other power management agent configured to enforce a power budget, to thereby enable management of power among the plurality of servers through the power management agent and the at least one other power management agent.

11. The system. according to claim 10, wherein the power management agent is distributed at a plurality of locations, wherein the plurality of locations comprises at least one of hardware and software.

12. A method for managing power among electronic systems, said method comprising:
    determining a power budget threshold;

monitoring current power consumption levels of the electronic systems;
predicting a future violation of the power budget threshold;
selecting one or more of the electronic systems to throttle;
determining throttling levels for the selected one or more of the electronic systems;
recommending the determined throttling levels to the selected one or more of the electronic systems to thereby substantially prevent operating the electronic systems at a power consumption level that substantially exceeds the power budget threshold, wherein predicting a future violation of the power budget threshold further comprises implementing a prediction algorithm to predict a future violation of the power budget threshold, wherein the prediction algorithm is selected bused upon error limits allowable with mispredictions of possible future violations throttling the selected one or more of the electronic systems in response to the recommending.

13. The method according to claim 12, wherein determining a power budget threshold further comprises determining the power budget threshold at least one of at design time and at run-time.

14. The method according to claim 13, wherein determining a power budget threshold further comprises determining a power budget threshold at design time when the targeted benefits of the power budget enforcement are geared towards at least one of reducing provisioning of cooling and power delivery and increasing flexibility in a selection of components for the electronic systems.

15. The method according to claim 13, wherein determining a power budget threshold further comprises determining the power budget threshold based upon a trigger external to the electronic systems.

16. The method according to claim 12, further comprising the step of enabling communications between a power management agent configured to enforce a power budget of the electronic systems and at least one other power management agent configured to enforce a power budget, to thereby enable management of power among the electronic systems through the power management agent and die at least one other power management.

17. The method according to claim 12, wherein selecting one or more of the electronic systems to throttle further comprises selecting one or more of the electronic systems to throttle according to a round-robin allocation scheme.

18. The method according to claim 12, wherein selecting one or more of the electronic systems to throttle further comprises selecting one or more of the electronic systems to throttle based upon a relative priority of tasks running on the electronic systems.

19. The method according to claim 12, wherein determining throttling levels for the selected one or more of the electronic systems further comprises determining throttling levels for the selected one or more of the electronic systems based upon the rigidity associated with enforcement of the power budget.

20. A power management the power management system comprising a power management agent and one or more electronic systems, wherein agent comprising:

means for enabling communications between the agent and the one or more electronic systems;
means for monitoring power consumption levels of the one or more electronic systems;
means for predicting a future power consumption level of the one or more electronic systems;
means for determining a power budget threshold for the one or more electronic systems;
means for enabling communications between the power management agent and the one or more electronic systems and enabling communications between the power management agent and at least one oilier power management agent configured to enforce a power budget, to thereby enable management of power among the one or more electronic systems through the power management agent and the at least one other power management agent;
means for determining whether a predicted future power consumption level will exceed the power budget threshold;
means for selecting at least one of the one or more electronic systems to throttle in response to a determination that the predicted future power consumption level will exceed the power budget threshold and further in response to the relative priority of tasks running on the one or more electronic systems and a prediction of resource usage among the one or more electronic systems; and
means for selecting a throttle level to be applied to the selected at least one of the one or more electronic systems to substantially prevent the future power consumption level from exceeding the power budget threshold.

21. A computer program product embodied on a computer-readable storage device and comprising code that, when executed, causes ii computer to perform the following:
determine a power budget threshold;
monitor current power consumption levels of electronic systems;
predict a future violation of the power budget threshold;
enable communication between a power management agent configured to enforce a power budget of the electronic systems and at least one other power management agent configured to enforce a power budget, to thereby enable management of power among the electronic systems through the power management agent and the at least one other power management agent;
select one or more of the electronic systems to throttle according to the relative priority of tasks running on the electronic systems and a prediction of resource usage among the electronic systems;
determine throttling levels for the selected one or more of the electronic systems; and
recommend die determined throttling levels to the selected one or wore of the electronic systems to thereby substantially prevent operating the electronic systems at a power consumption level that substantially exceeds the power budget threshold.

* * * * *

UNITED STATES PATENT AND TRADEMARK OFFICE
CERTIFICATE OF CORRECTION

PATENT NO. : 7,581,125 B2
APPLICATION NO. : 11/232525
DATED : August 25, 2009
INVENTOR(S) : Parthasarathy Ranganathan et al.

It is certified that error appears in the above-identified patent and that said Letters Patent is hereby corrected as shown below:

In column 10, line 61, in Claim 11, delete "system." and insert -- system --, therefor.

In column 11, line 15, in Claim 12, delete "bused" and insert -- based --, therefor.

In column 11, lines 16-18, in Claim 12, delete "violations throttling the selected one or more of the electronic systems in response to the recommending." and
insert -- violations; and
    throttling the selected one or more of the electronic systems in response to the recommending. --, therefor.

In column 11, line 40, in Claim 16, delete "die" and insert -- the --, therefor.

In column 11, line 57, in Claim 20, after "management" delete "the power management".

In column 11, line 59, in Claim 20, before "agent" insert -- the power management --.

In column 11, line 59, in Claim 20, delete "comprising:" and insert -- comprises: --, therefor.

In column 12, line 12, in Claim 20, delete "oilier" and insert -- other --, therefor.

In column 12, line 35, in Claim 21, delete "ii" and insert -- a --, therefor.

In column 12, line 53, in Claim 21, delete "die" and insert -- the --, therefor.

In column 12, line 54, in Claim 21, delete "wore" and insert -- more --, therefor.

Signed and Sealed this

Twelfth Day of October, 2010

David J. Kappos
*Director of the United States Patent and Trademark Office*